Feb. 21, 1933.    C. M. BOVARD    1,898,169

PISTON PIN

Filed March 26, 1932

INVENTOR
Charles M. Bovard
BY
Ward Crosby & Neal
ATTORNEYS

Patented Feb. 21, 1933

1,898,169

UNITED STATES PATENT OFFICE

CHARLES M. BOVARD, OF GROVE CITY, PENNSYLVANIA, ASSIGNOR TO COOPER-BESSEMER CORPORATION, OF MOUNT VERNON, OHIO, A CORPORATION OF OHIO

PISTON PIN

Application filed March 26, 1932. Serial No. 601,317.

The invention relates to a piston pin and the connection between it and the connecting rod, and aims particularly to satisfy the requirements of high speed engines wherein the pin should be as light in weight as possible, and nevertheless strong and rugged.

The invention also aims to provide a pin which will afford relatively large bearing area, and be simple and economical in construction.

Further objects and advantages of the invention will be in part obvious and in part specifically mentioned in the description hereinafter contained which, taken in conjunction with the accompanying drawing, discloses a preferred embodiment of the invention, such embodiment, however, is to be regarded merely as illustrative. In the drawing—

Figure 1:
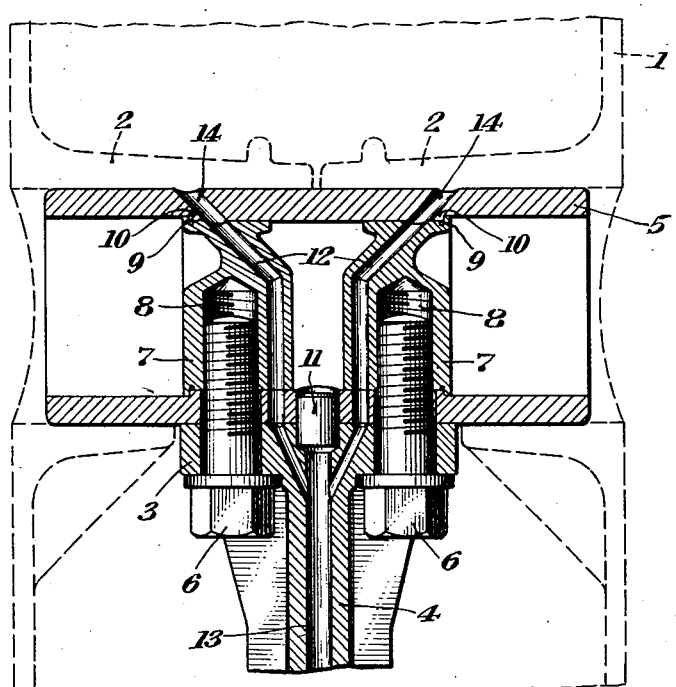
Fig. 1 is a sectional view of a piston pin and the adjacent end of a connecting rod, constructed in accordance with the invention, the adjacent parts of the piston appearing in dotted lines.
Figure 2:
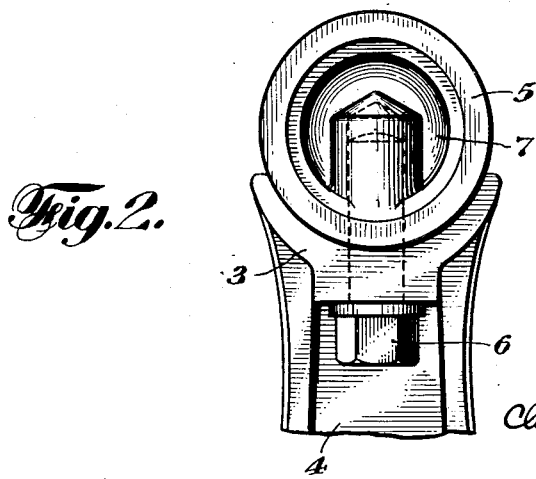
Fig. 2 is an end view of the pin and connecting rod parts.

The invention is illustrated as applied to a piston pin adapted to be received in a piston 1 having interior hubs 2, the opposed inner ends of which are but slightly spaced on what may be termed the "far" side of the pin, and are more widely spaced on the "near" side of the pin in order to afford room for the head 3 of the connecting rod 4 to be interposed therebetween.

The piston pin 5 is made hollow in order to reduce weight, and in accordance with the present invention may have a smooth round exterior surface throughout, whereby it will be simple and economical to manufacture. The head 3 of the connecting rod is arcuately recessed to seat on the "near" side of the pin, and bolts 6 pass through the head of the connecting rod and the wall of the pin to fasten the two parts together.

The bolts 6 engage one or more inserts 7 having threaded recesses 8 therein in which the bolts are received. These inserts 7 preferably fit tightly within the pin 5 and reinforce the latter markedly against distortion, without adding unduly to the weight.

In the illustrated form of the invention the inserts 7 are provided with shoulders 9 which are pressed against complementary shoulders 10 in the interior of the pin in assembling the construction. This is in case the inserts are made in pieces separate from the pin. A dowel pin 11 may also be employed to position the connecting rod properly on the pin, and lubricating ducts 12 in the inserts 7 may be provided to afford communication between the passage 13 in the connecting rod and holes 14 on the "far" side of the piston pin to afford lubrication for the latter.

A construction of the above nature affords a relatively large bearing area on the piston pin, renders the latter light and yet strong, and enables the parts to be made in simple and economical form.

While a specific embodiment of the invention has been described, it will be understood that many changes may be made therein without departing from its principles, as set forth in the appended claims.

I claim:

1. In combination, a hollow piston pin having a round exterior surface, a connecting rod having a head seated against the near side of said pin, a bolt extending through said head to the hollow interior of said pin, and an insert within said pin engaging said bolt to fasten the pin to the connecting rod.

2. In combination, a hollow piston pin having a round exterior surface, a connecting rod having a head seated against the near side of said round surface, a bolt extending through said head to the hollow interior of said pin and a pin reinforcing member filling the interior part of the pin which is alined with the bolt, said member engaging said bolt to fasten the pin to the connecting rod.

3. In combination, a hollow piston pin having a round exterior surface, a connecting rod having a head seated against the near side of said pin, a connecting rod fastening member passing through the exterior wall of said pin and a pin reinforcing member filling the interior part of the pin which is alined with said fastening member, said members being connected together to fasten the pin to the connecting rod.

4. In combination, a hollow piston pin having a round exterior surface, a connecting rod having a head seated against the near side of said round surface, a bolt extending through said head to the hollow interior of said pin and a pin reinforcing member filling the interior part of the pin which is alined with the bolt, said member engaging said bolt to fasten the pin to the connecting rod, said connecting rod, pin and reinforcing member having lubricating ducts adapted to afford lubrication.

5. In combination, a hollow piston pin having a round exterior surface, a connecting rod having a T-shaped head arcuately recessed to seat against the near side of said round surface, said head terminating on the near side of the pin, bolts passing through the opposite sides of said head and through the exterior wall of said pin, and reinforcing members within said pin connected to said bolts.

In testimony whereof I have signed my name to this specification.

C. M. BOVARD.